United States Patent Office 2,863,844
Patented Dec. 9, 1958

2,863,844

SOLUTIONS OF POLYTRIFLUORO-CHLORETHYLENE

Otto Fuchs, Frankfurt am Main Hochst, Anton Staller, Frankfurt am Main Sindlingen, and Rudolf Schäff, Frankfurt am Main Hochst, Germany, assignors to Farbwerke Hoechst Aktiengesellschaft vormals Meister Lucius & Brüning, Frankfurt am Main Hochst, Germany, a company of Germany No Drawing. Application June 8, 1953
Serial No. 360,385

Claims priority, application Germany June 10, 1952

7 Claims. (Cl. 260—30.2)

As compared with other synthetic substances of high molecular weight, polymerized trifluorochlorethylene has a very high softening point (240° C. or higher) and its solubility in inorganic and organic substances is very low. Although both properties are of great advantage from the point of view of the practical utility of the polymer, they make it difficult to shape the polymer, for instance, for producing foils, fibers and the like. A further disadvantage is that the polymer separates out of its solutions in the solvents hitherto known at temperatures above 100° C. when the solutions are cooled, and this is especially undesirable in producing coatings of the polymer on solid supports. For this reason there is a great demand for solvents of which the boiling point is not too high and which also permit the solutions to be cooled as far as possible below about 110° C. without the occurrence of demixing accompanied by separation of the polymer.

Now we have found that the above requirements are fulfilled by solutions of polymerized trifluoro-chlorethylene in 1:1:2:2-tetrafluoro-3:3:4:4-tetrachlorocyclobutane (boiling at 132° C.) alone or in admixture with another organic compound viz. an aliphatic, monocyclic or bicyclic aromatic, monocyclic heterocyclic or monocyclic or bicyclic hydroaromatic compound containing 1–4 substituents, for example, alkyl groups containing 1–3 carbon atoms, alkoxy groups containing 1–3 carbon atoms, chlorine atoms or —CF$_3$ groups.

In the organic compound to be used in admixture with the 1:1:2:2-tetrafluoro-3:3:4:4-tetrachlorocyclobutane the aforesaid substituents may all be the same or they may be different in a single compound.

The polymer may be dissolved in the solvent or solvent mixture at a temperature above about 80° C. The exact temperature of dissolution can be determined in any particular case by a simple test.

The difference between the solvent mixtures of the present invention and other solvent mixtures is illustrated by the following:

If, for instance, the polymer is dissolved in a mixture of para-xylene and ortho-chlorobenzotrifluoride (the latter being capable alone of dissolving the polymer) the polymer separates out at 115° C. A solution of the polymer in a mixture of 1:2:3-trifluoropentachloropropane (which is itself a solvent for polymerized trifluorochlorethylene) and xylene is stable only at temperatures not lower than 105° C. If, however, a mixture of 1:1:2:2-tetrafluoro-3:3:4:4-tetrachlorocyclobutane and para-xylene is used as solvent, the solution of the polymer becomes non-homogeneous only at a temperature of 75° C. or lower.

In the following table are given examples of solutions in accordance with the invention. The polymerized trifluorochlorethylene serving as starting material has a molecular weight of 75,000 according to "NST" and osmotic data given by Kaufmann and Muthana in J. Polymer Science, 6, page 251 (1951).

The concentration of the polymer in the solutions of the examples given in the table ranges from 5 to 11 percent. The solvents are also effective at lower or higher concentrations of the polymer in the solutions. For the preparation of the solvent mixture 15–70 percent, and advantageously 20–60 percent, of the said solvents should be added to the 1:1:2:2-tetrafluoro-3:3:4:4-tetrachlorocyclobutane.

| Nature of the additive | Composition of the solution (percentage by weight) | | | Temperature of commencement of separation of the polymer, °C. |
|---|---|---|---|---|
| | Additive | 1:1:2:2-tetra-fluoro-3:3:4:4-tetrachloro-cyclobutane | Polymer | |
| none | | 89 | 11 | 100 |
| toluene | 23.5 | 71 | 5.5 | 76 |
| Do | 22 | 67 | 11 | 83 |
| benzene | 13.0 | 79 | 8.0 | 75 |
| para-cymene | 22.5 | 67.5 | 10 | 91 |
| ortho-chloro-toluene | 23.5 | 71 | 5.5 | 75 |
| Do | 22 | 67 | 11 | 75 |
| ortho-dichloro-benzene | 22.5 | 67.5 | 10 | 76 |
| 2-methyl-pyridine | 19 | 76 | 5 | 64 |
| 2:4:6-trimethyl-pyridine | 38 | 57 | 5 | 66 |
| Do | 57 | 38 | 5 | 80 |
| anisole | 38 | 57 | 5 | 80 |
| hydroquinone dimethyl ether | 40 | 55 | 5 | 75 |
| resorcinol dimethyl ether | 40 | 55 | 5 | 82 |
| 1:2:3-trifluoro-pentachloropropane | 23.5 | 71 | 5.5 | 66 |
| 1:1:2:2-tetra-chlor-ethane | 25.0 | 68 | 7.0 | 83 |
| perchlorethylene | 22 | 71 | 7 | 80 |
| naphthalene | 23.5 | 71 | 5.5 | 85 |
| tetrahydronaphthalene | 23.5 | 71 | 5.5 | 86 |
| dioxane | 13.0 | 79 | 8.0 | 78 |
| 1:1-dimethoxy-1-ethoxy-ethane $$H_3C-\underset{\underset{OC_2H_5}{|}}{C}-(OCH_3)_2$$ | 47.5 | 47.5 | 5 | 75 |
| phenetole | 13.0 | 79 | 8.0 | 84 |
| ethyl-benzene | 13.0 | 79 | 8.0 | 82 |

Among the compounds added those which contain alkyl groups, alkoxy groups, for example, methoxy groups, chlorine atoms or —CF$_3$ groups, are especially suitable because with these substituents the temperature of dissolution is lower by 30–40 degrees centigrade, more highly concentrated solutions can be prepared, and finally a smaller proportion of 1:1:2:2-tetrafluoro-3:3:4:4-tetrachlorocyclobutane suffices to produce the same result, than if those substituents were absent.

We claim:

1. Solution of from substantially 5 to 11% polytrifluorochlorethylene in a mixture of from 19 to 80% of 1:1:2:2-tetrafluoro-3:3:4:4-tetrachlorocyclobutane with from substantially 15 to 70% of another organic compound selected from the group consisting of benzene, substituted benzene, dioxane, naphthalene, tetrahydronaphthalene, 1:2:3-trifluoropentachloropropane, 1:1:2:2-tetrachlorethane, 1:1-dimethoxy-1-ethoxy-ethane, perchlorethylene, 2-methyl-pyridine, and 2:4:6-trimethyl-pyridine, wherein said substituted benzene compound may contain from 1 to 4 substituents selected from the group consisting of chloro, alkyl of 1 to 3 carbon atoms and alkoxy of 1 to 3 carbon atoms, and wherein said substituted benzene compound is free from other substituents.

2. Solution according to claim 1, wherein the polytrifluorochlorethylene is in a mixture of 1:1:2:2-tetrafluoro-3:3:4:4-tetrachlorocyclobutane with toluene.

3. Solution according to claim 1, wherein the polytrifluorochlorethylene is in a mixture of 1:1:2:2-tetrafluoro-3:3:4:4-tetrachlorocyclobutane with para-xylene.

4. Solution according to claim 1, wherein the polytrifluorochlorethylene is in a mixture of 1:1:2:2-tetrafluoro-3:3:4:4-tetrachlorocyclobutane with 2-methylpyridine.

5. Solution according to claim 1, wherein the polytrifluorochlorethylene is in a mixture of 1:1:2:2-tetrafluoro-3:3:4:4-tetrachlorocyclobutane with perchlorethylene.

6. Solution according to claim 1, wherein the polytrifluorochlorethylene is in a mixture of 1:1:2:2-tetrafluoro-3:3:4:4-tetrachlorocyclobutane with dioxane.

7. Solution of polytrifluorochlorethylene in 1:1:2:2-tetrafluoro-3:3:4:4-tetrachlorocyclobutane.

References Cited in the file of this patent

UNITED STATES PATENTS 2,656,330   Sprung ---------------- Oct. 20, 1953